United States Patent
Fujiki

(10) Patent No.: US 10,450,015 B2
(45) Date of Patent: Oct. 22, 2019

(54) CRAWLER TRACTOR

(71) Applicant: Yanmar Co., Ltd., Osaka-shi, Osaka-fu (JP)

(72) Inventor: Katsumi Fujiki, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 15/575,308

(22) PCT Filed: Mar. 24, 2016

(86) PCT No.: PCT/JP2016/059505
§ 371 (c)(1),
(2) Date: Nov. 17, 2017

(87) PCT Pub. No.: WO2016/185795
PCT Pub. Date: Nov. 24, 2016

(65) Prior Publication Data
US 2018/0154956 A1    Jun. 7, 2018

(30) Foreign Application Priority Data

May 20, 2015    (JP) .................................. 2015-103017
May 25, 2015    (JP) .................................. 2015-105918

(51) Int. Cl.
*B62D 55/10* (2006.01)
*B62D 24/00* (2006.01)
(Continued)

(52) U.S. Cl.
CPC .............. *B62D 55/10* (2013.01); *B62D 24/00* (2013.01); *B62D 25/12* (2013.01); *B62D 63/04* (2013.01)

(58) Field of Classification Search
CPC ........ B62D 55/10; B62D 24/00; B62D 25/12; B62D 63/04
(Continued)

(56) References Cited

U.S. PATENT DOCUMENTS 3,049,186 A * 8/1962 Garrett ...................... B60P 3/41
                                                                180/235
3,226,859 A * 1/1966 Kampert ............... E02F 3/7618
                                                                172/826
(Continued)

FOREIGN PATENT DOCUMENTS

EP          2721322 A1     4/2014
JP         59-074150 U     5/1984
(Continued)

OTHER PUBLICATIONS

International Search Report dated Jun. 14, 2016 issued in corresponding PCT Application PCT/US2016/059505.
(Continued)

*Primary Examiner* — Jacob D Knutson
(74) *Attorney, Agent, or Firm* — Norton Rose Fulbright US LLP

(57) ABSTRACT

A crawler tractor that transfers power of an engine to a driving wheel of a crawler-type travelling device through a transmission case and a front drive axle, the crawler tractor including: a pair of main frames; a pair of truck frames; a pair of lower frames; a pair of rear beams; and a pair of rear housings. Front portions of the pair of main frames are fixedly coupled to front portions of the pair of truck frames through the front drive axle. Longitudinal intermediate portions of the pair of main frames are fixedly coupled to the pair of lower frames. Rear portions of the pair of main frames are fixedly coupled to the pair of rear housings through the pair of rear beams.

16 Claims, 12 Drawing Sheets

(51) Int. Cl.
   *B62D 25/12*   (2006.01)
   *B62D 63/04*   (2006.01)
(58) Field of Classification Search
   USPC .......................................................... 180/9.1
   See application file for complete search history.

(56) References Cited

U.S. PATENT DOCUMENTS

| | | | | |
|---|---|---|---|---|
| 4,464,852 | A * | 8/1984 | Rice ..................... | E02F 3/7618 |
| | | | | 172/811 |
| 7,484,579 | B2 * | 2/2009 | Akashima .......... | B62D 33/0625 |
| | | | | 180/6.32 |
| 2004/0149462 | A1 * | 8/2004 | Okamoto ............... | B62D 49/02 |
| | | | | 172/292 |
| 2008/0185211 | A1 * | 8/2008 | Akashima .......... | B62D 33/0625 |
| | | | | 180/367 |
| 2011/0284306 | A1 | 11/2011 | Ibe et al. | |

FOREIGN PATENT DOCUMENTS

| | | |
|---|---|---|
| JP | 02-143325 U | 12/1990 |
| JP | H2-143325 U | 12/1990 |
| JP | H04-121289 A | 4/1992 |
| JP | 2001-055161 A | 2/2001 |
| JP | 2002-127769 A | 5/2002 |
| JP | 2002-225747 A | 8/2002 |
| JP | 3675927 B2 | 7/2005 |
| JP | 2008-195318 A | 8/2008 |
| JP | 2009-196637 A | 9/2009 |
| JP | 2010-173602 A | 8/2010 |
| JP | 4672886 B2 * | 4/2011 |
| JP | 4672886 B2 | 4/2011 |
| JP | 2012-091752 A | 5/2012 |
| JP | 2012086815 A * | 5/2012 |
| JP | 2014-024485 A | 2/2014 |
| KR | 10-2011-0112388 A | 10/2011 |

OTHER PUBLICATIONS

Korean Office Action dated Feb. 25, 2019 issued in corresponding KR Application 10-2017-7036576.
European Search Report dated Jun. 5, 2018 issued in corresponding EP Application 16796189.5.
Japanese Office Action dated Nov. 6, 2018 issued in corresponding JP Application 2015-103017.
Japanese Office Action dated Oct. 9, 2018 issued in corresponding JP Application 2015-105918.

* cited by examiner

US 10,450,015 B2

CRAWLER TRACTOR

CROSS REFERENCES TO RELATED APPLICATIONS

This application is a national stage application pursuant to 35 U.S.C. § 371 of International Application No. PCT/JP2016/059505, filed on Mar. 24, 2016, which claims priority under 35 U.S.C. § 119 to Japanese Patent Application No. 2015-103017, filed on May 20, 2015, and Japanese Patent Application No. 2015-105918, filed on May 25, 2015. The disclosure of each of the above-listed applications is incorporated by reference herein in its entirety.

TECHNICAL FIELD

The present invention relates to a technique of fixing a body of a tractor on a crawler-type travelling device.

BACKGROUND ART

A technique of fixing an engine in a front portion of a crawler frame, fixing a transmission case in a rear portion of the crawler frame, and coupling the engine and the transmission case to each other by a frame has been known to date (see, for example, Patent Literature 1: PTL 1).

CITATION LIST

Patent Literature

PTL 1: Japanese Patent No. 4672886

SUMMARY OF INVENTION

Technical Problem

The crawler tractor disclosed in PTL 1, a frame structure is designed specifically for crawler tractors. Thus, cost reduction by, for example, using a frame structure of a transistor for a frame of a tractor of another type cannot be achieved. In addition, since only a small number of frame structures of the crawler tractor disclosed in PTL 1 are fabricated, an interval between production periods has been long. For this reason, quality variations easily occur, which might cause problems due to the variations.

It is therefore an object of the present invention to provide a crawler tractor that can reduce costs by sharing a frame structure with a wheel tractor.

Solution to Problem

A crawler tractor according to an aspect of the present invention is a crawler tractor that transfers power of an engine to a driving wheel of a crawler-type travelling device through a transmission case and a front drive axle. The crawler tractor includes: a pair of main frames extending longitudinally; a pair of truck frames constituting the crawler-type travelling device and extending longitudinally; a pair of lower frames coupling the pair of truck frames to each other and extending laterally; a pair of beams projecting from rear portions of the pair of truck frames toward a lateral center; and a pair of rear housings fixed to left and right sides of the transmission case, wherein the transmission case is fixed to rear portions of the pair of main frames, front portions of the pair of main frames are fixedly coupled to front portions of the pair of truck frames through the front drive axle, longitudinal intermediate portions of the pair of main frames are fixedly coupled to the pair of lower frames, and the rear portions of the pair of main frames are fixedly coupled to the pair of rear housings through the pair of beams.

In the crawler tractor according to the aspect of the present invention, a pair of rear mounts is preferably attached to left and right sides of a rear portion of the transmission case, and a fuel tank and a rear portion of a cabin are preferably fixed onto the pair of rear mounts.

In the crawler tractor according to the aspect of the present invention, the front portions of the pair of main frames, the front drive axle, and the lower frames are preferably fixed to a front dozer bracket, and the front dozer is preferably attachable to the front dozer bracket.

It is preferable a crawler tractor according to another aspect of the present invention includes: a transmission case; a pair of main frames attached to the transmission case; and a front dozer bracket attached to the pair of main frames, the front dozer bracket supports a front drive axle, the front drive axle is provided with a front axle case, and the front axle case is fixed to the main frames.

The crawler tractor according to the aspect of the present invention preferably further includes a pair of truck frames, and the pair of truck frames is preferably fixed to the front axle case.

It is preferable that the crawler tractor according to the aspect of the present invention further includes: a pair of coupling brackets attached to the pair of main frames; and a pair of lower frames attached to the pair of truck frames, and the truck frames are fixed to the pair of coupling brackets through the pair of lower frames.

It is preferable that the crawler tractor according to the aspect of the present invention further includes: a pair of rear housings attached to the transmission case; and a pair of rear beams attached to the pair of truck frames, and the pair of truck frames is fixed to the pair of rear housings through the pair of rear beams.

It is preferable that in the crawler tractor according to the aspect of the present invention, a straight-travelling stepless transmission device is disposed in the transmission case, a turning stepless transmission device is disposed on the front drive axle, a hydraulic pump and a hydraulic motor are disposed in series on a pump shaft in the straight-travelling stepless transmission device, a motor shaft serving as an output shaft of the straight-travelling stepless transmission device is disposed on the pump shaft, and power of the motor shaft is transferred to the front drive axle through a forward-reverse movement switching device and a sub-transmission device to thereby cause the crawler-type travelling device to operate.

Advantageous Effects of Invention

A crawler tractor according to some aspects of the present invention can reduce costs by sharing a frame structure with a wheel tractor.

DESCRIPTION OF EMBODIMENTS

Figure 1:
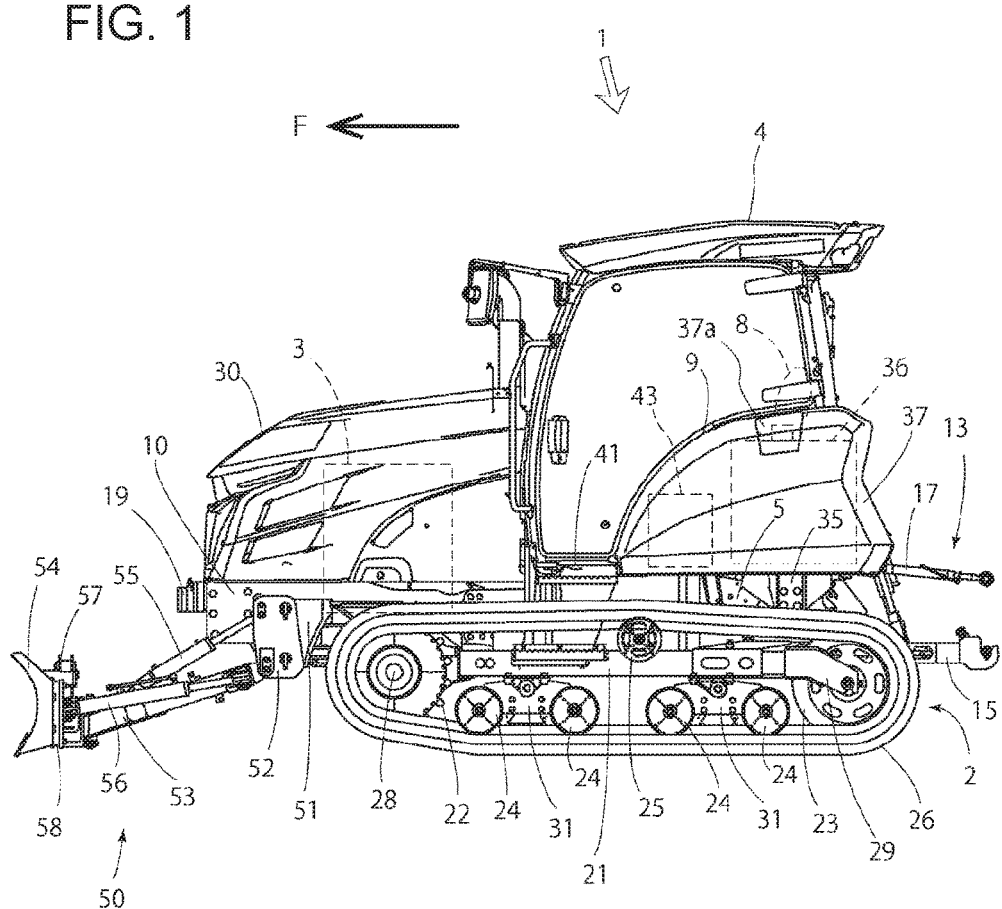
FIG. 1 A side view of a crawler tractor according to an embodiment of the present invention.

With reference to FIGS. 1 through 6, an overall configuration of a crawler tractor 1 will be described.

In the following description, direction F is a forward direction. In some of the drawings, one of rear mounts 35 or fuel tanks 36 is not shown for easy description.

In the crawler tractor 1, an engine 3 or a body unit such as a cabin 4 (upper structure) is fixed onto a crawler-type travelling device 2 with a pair of main frames 10 interposed therebetween. The engine 3 is covered with a hood 30.

The inside of the cabin 4 is configured as a cockpit where a driver seat 8 is disposed. Around the driver seat 8, a steering wheel 94, an accelerator pedal 95, a shift lever 96, a brake pedal 97, a clutch pedal 98, a forward-reverse movement switching lever 99, and so forth are disposed. An operator can operate the accelerator pedal 95 or the shift lever 96, for example, while sitting on the driver seat 8 to control the crawler tractor 1 (see FIGS. 5 and 6).

The pair of main frames 10 includes a pair of front frames 11 and a pair of rear frames 12. Each pair of the front frames 11 and the rear frames 12 includes a pair of plate members extending longitudinally (front-rear direction) and a reinforcing member extending laterally (left-right direction) and coupling the pair of plate members to each other. A bumper 19 is coupled to the pair of front frames 11. Front portions of the pair of rear frames 12 are fixed to the rear portions of the pair of front frames 11.

The engine 3 is fixed between the pair of front frames 11. The transmission case 5 is fixed between rear portions of the pair of rear frames 12. By fixedly disposing the pair of main frames 10 and the transmission case 5, a vehicle body frame having high rigidity can be obtained. A front drive axle 6 oriented laterally is fixedly provided under front portions of the pair of front frames 11.

The crawler-type travelling device 2 includes a pair of truck frames 21, a pair of driving wheels 22, a pair of tension rollers 23, a plurality of free rotating wheels 24, a pair of guide rollers 25, and a pair of crawler belts 26. The pair of truck frames 21 extends longitudinally and is disposed at outer sides of the pair of main frames 10. The pair of truck frames 21 are coupled to each other by a pair of lower frames 27 extending laterally. The pair of driving wheels 22 is fixed to driving shafts 28 projecting sideways from left and right sides of the front drive axle 6.

The pair of tension rollers 23 is rotatably supported by the rear ends of a pair of tension frames 29. The pair of tension frames 29 is configured to extend and contract rearward from the rear ends of the pair of truck frames 21. The free rotating wheels 24 are rotatably supported by the front and rear of a plurality of equalizer frames 31. The equalizer frames 31 are supported by lower portions of the pair of truck frames 21 to swing longitudinally. The guide rollers 25 are rotatably supported on longitudinally intermediate portions of the pair of truck frames 21. The pair of crawler belts 26 are wound around the pair of driving wheels 22, the pair of tension rollers 23, the free rotating wheels 24, and the guide rollers 25.

In the configuration of coupling the crawler-type travelling device 2 to the vehicle body frame (the pair of main frames 10 and the transmission case 5), the front ends of the pair of truck frames 21 are fixed to the pair of main frames 10 through the front drive axle 6 and the pair of lower frames 27, and rear portions of the pair of truck frames 21 are fixed to the transmission case 5 through a pair of rear beams 33 and rear housings 34.

In the front drive axle 6, a gear box 6a is formed at a lateral center (see FIG. 11), a pair of front axle cases 6b is provided at the lateral ends of the gear box 6a. The pair of front frames 11 is attached to a lateral center of the pair of front axle cases 6b. Front ends of the pair of truck frames 21 are fixed to the rear surfaces of outer end portions of the pair of front axle cases 6b.

A pair of coupling brackets 32 each having an inverted T shape when viewed from rear is fixed to the upper surfaces of the lateral centers of the pair of lower frames 27. Upper portions of pair of coupling brackets 32 are fixed to side surfaces of the rear portions of the pair of front frames 11 with bolts or the like.

This configuration enables the vehicle body frame and the crawler-type travelling device 2 to be firmly fixedly coupled to each other. Thus, rigidity of the crawler tractor 1 can be enhanced.

Front ends of a pair of lower links 15 and a pair of check chains 16 constituting a working machine attachment device 13 are coupled to the pair of rear housings 34 and the rear surfaces of the pair of rear beams 33. A top link 17 of the working machine attachment device 13 is coupled to the rear surface of a hydraulic case fixed to the upper surface of the transmission case 5. A pair of lift arms 14 (see FIG. 2) projects rearward from side surfaces of the hydraulic case. The rear ends of the pair of lift arms 14 are coupled to the pair of lower links 15 through lift links. The pair of lift arms 14 is driven to be lifted or lowered by a hydraulic cylinder.

The pair of rear mounts 35 is fixed to the outer side surfaces of the pair of rear housings 34. The rear mounts 35 include flat plate parts and strut parts. The strut parts are fixed to the rear housings 34. The strut parts hang down from lower surface of vehicle-body left and right inner portions of the flat plate parts. The fuel tanks 36 are attached to the upper surfaces of the flat plate parts. The fuel tanks 36 are fixed with, for example, binding belts. Each of the fuel tanks 36 has a shape in accordance with the shape of a fender of the wheel-type tractor, is disposed in the fender, and outer side surfaces of the fuel tanks 36 are covered with covers.

A lower rear portion of the cabin 4 is fixed to the upper surfaces of the pair of rear mounts 35 with a pair of elastic members interposed therebetween. That is, in the pair of rear mounts 35, fuel tank brackets and cabin mounts are integrally configured. A lower front portion of the cabin 4 is fixed to the side surfaces of the pair of rear frames 12 through cabin brackets (not shown).

That is, the pair of rear mounts 35 is provided at the lateral ends of rear portions of the transmission case 5 with the pair of rear housings 34 interposed therebetween. The pair of fuel tanks 36 and a rear portion of the cabin 4 are fixed onto the pair of rear mounts 35.

This configuration enables the fuel tank 36 and the attachment member of the cabin 4 are integrally formed so that the number of parts can be reduced, and as a result, costs can be reduced.

Figure 2:
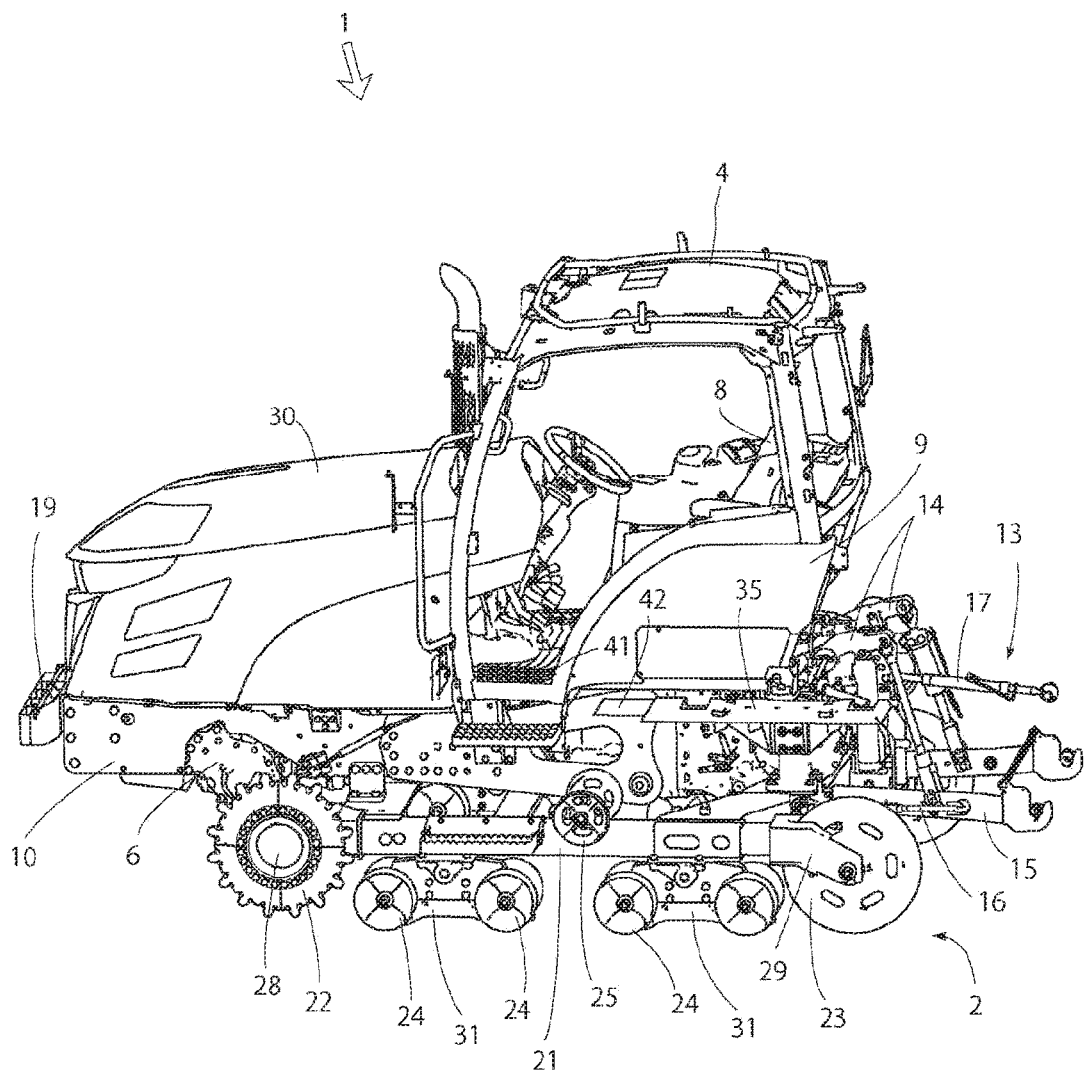
FIG. 2 A perspective view illustrating a state in which a crawler belt and a pane of the crawler tractor are detached.
Figure 3:
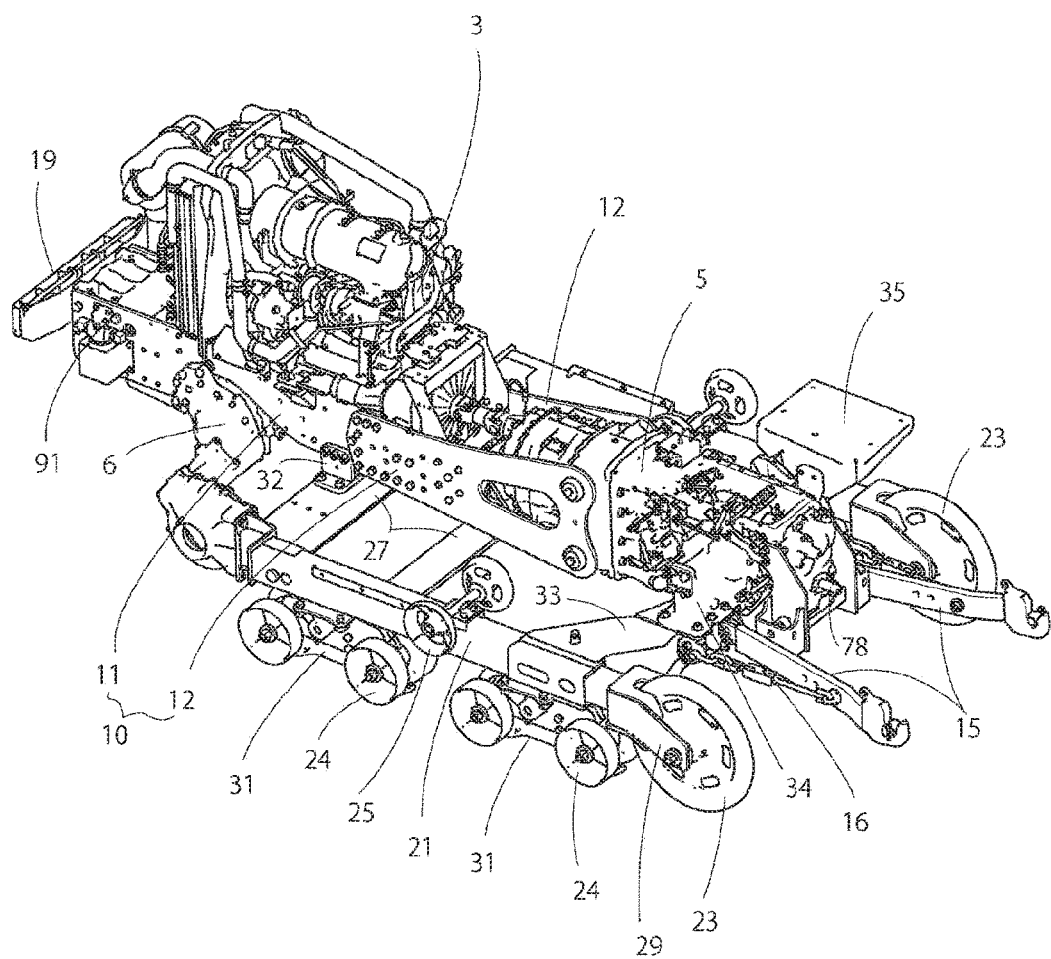
FIG. 3 A perspective view in which truck frames, an engine, and a transmission case are attached to main frames.
Figure 4:
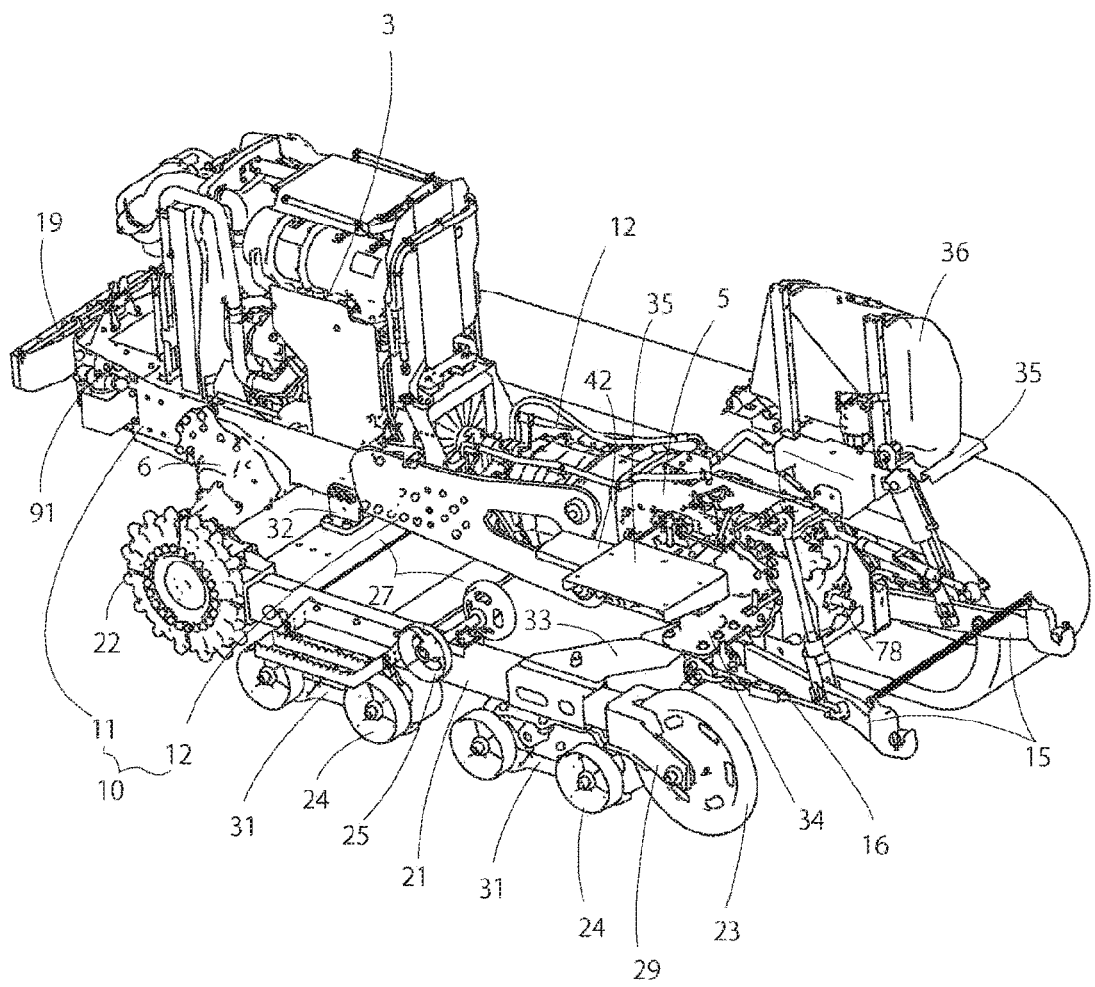
FIG. 4 A perspective view in which the truck frames, the engine, the transmission case, and a fuel tank are attached to the main frames.

With reference to FIGS. 1, 2, and 4, arrangement of a battery 43 will be described.

The battery 43 supplies electric power to electric components such as a driving part of a cell motor, a light, an interior illumination, and a control device. The battery 43 is disposed in a tank cover 37. The tank cover 37 covers the fuel tank 36 disposed at a side of a control unit. A pair of fenders 9 is disposed at the lateral ends of the driver seat 8 in the cabin 4 covering the control unit.

The upper structure of the crawler tractor 1 according to this embodiment is common to the wheel tractor, and thus, the pair of fenders 9 is provided to cover space above rear wheels of the wheel tractor. The pair of fuel tanks 36 is disposed in the pair of fenders 9. The outer side surfaces of the pair of fuel tanks 36 are covered with the pair of tank covers 37. The battery 43 is housed in one (left or right) of left and right fenders 9. The battery 43 is placed on a battery stand 42. The battery stand 42 extends forward of front portions of the rear mounts 35.

Supply ports for supplying fuel are provided at the longitudinal centers of the upper portions of the fuel tanks 36. The supply ports are exposed when lids 37a disposed at the longitudinal centers of upper portions of the tank covers 37 are opened.

This configuration enables internal space of the pair of fenders 9 to be effectively used. In addition, in the configuration in which the battery 43 is placed in the tank cover 37 located forward of the fuel tank 36, maintenance of the battery 43 can be performed by opening the tank cover 37. Since the battery stand 42 can be integrated with the rear mounts 35, sufficient strength can be obtained with a simple configuration. In addition, since the battery 43 is not disposed under the hood 30, the front of a radiator is not shielded so that cooling efficiency of the radiator can be enhanced. Furthermore, since the battery 43 is not disposed under the hood 30, an engine compartment can be made small so that a front field of view can be enlarged.

Figure 12:
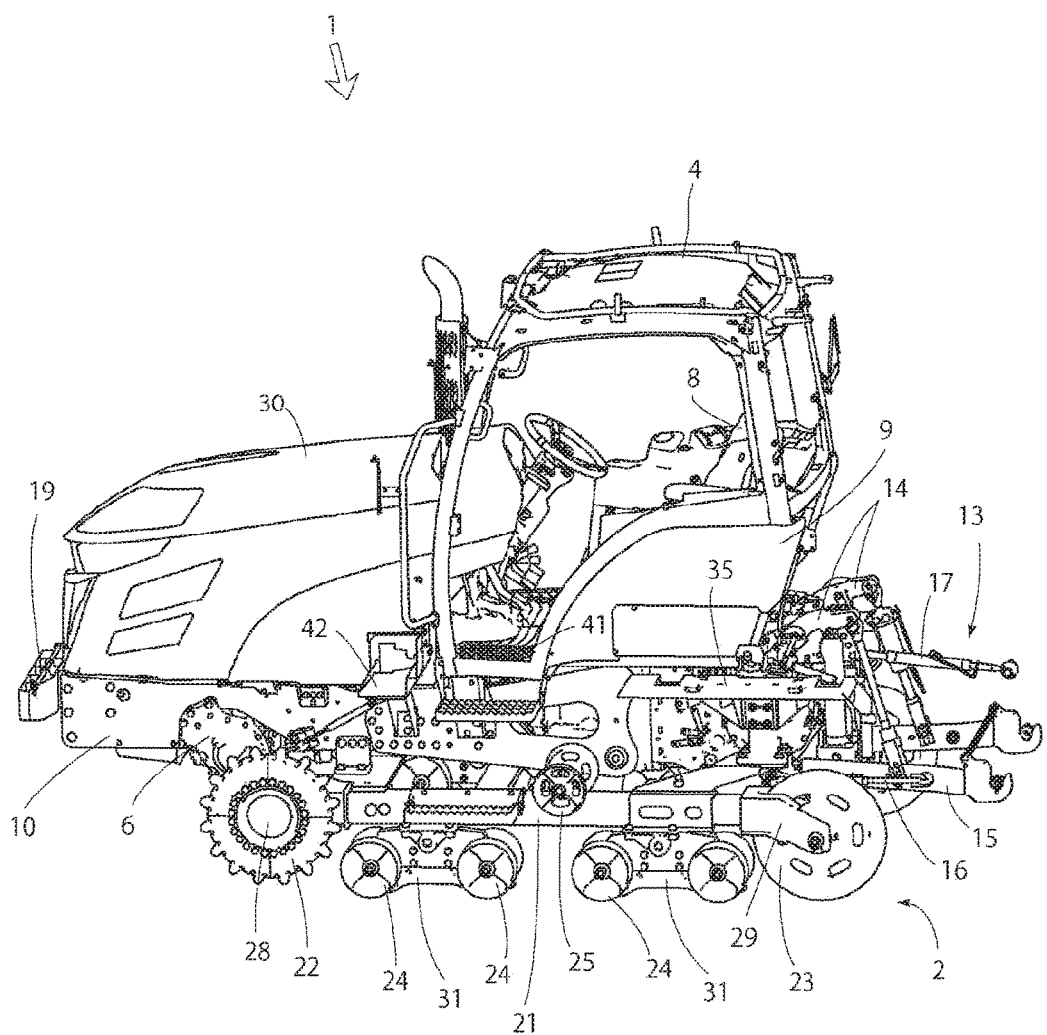
FIG. 12 A perspective view illustrating an example in which a battery is disposed in front of a step.

With reference to FIG. 12, another arrangement of the battery 43 will be described.

The battery 43 may be disposed outside the cabin 4, forward of a step 41, and above the crawler belts 26. The battery stand 42 is disposed forward of the step 41 provided on a side portion of a lower front portion of the cabin 4. In this case, maintenance can be performed on the outer crawler belts 26 without opening of the hood 30, and maintenance work can be made easy.

Figure 7:
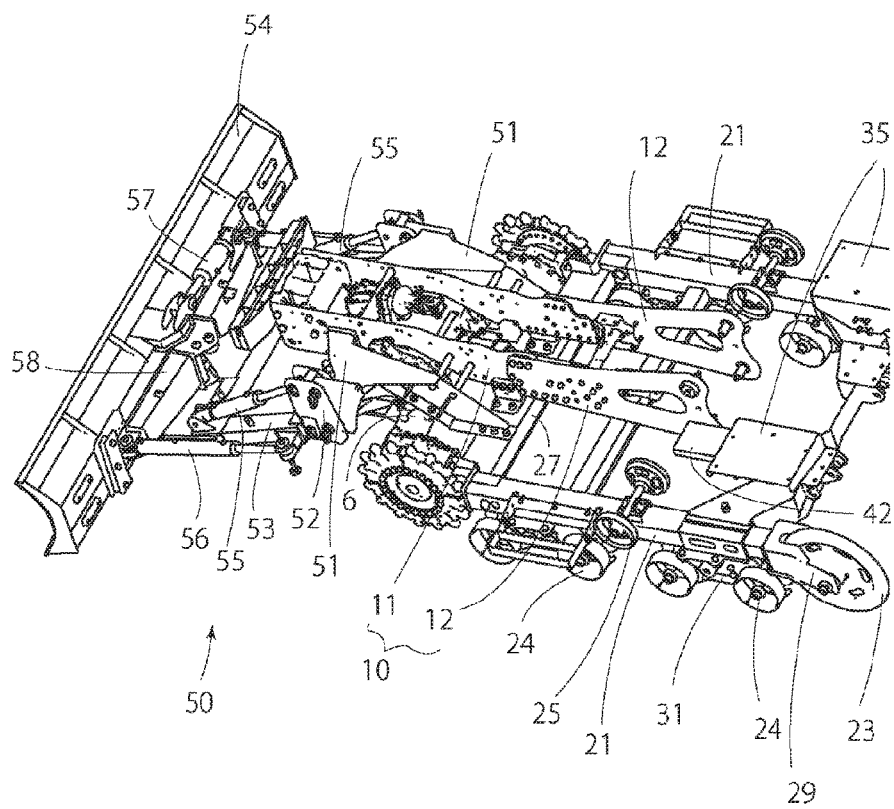
FIG. 7 A perspective view illustrating a state in which a front dozer is attached to a front portion of the main frame.
Figure 8:
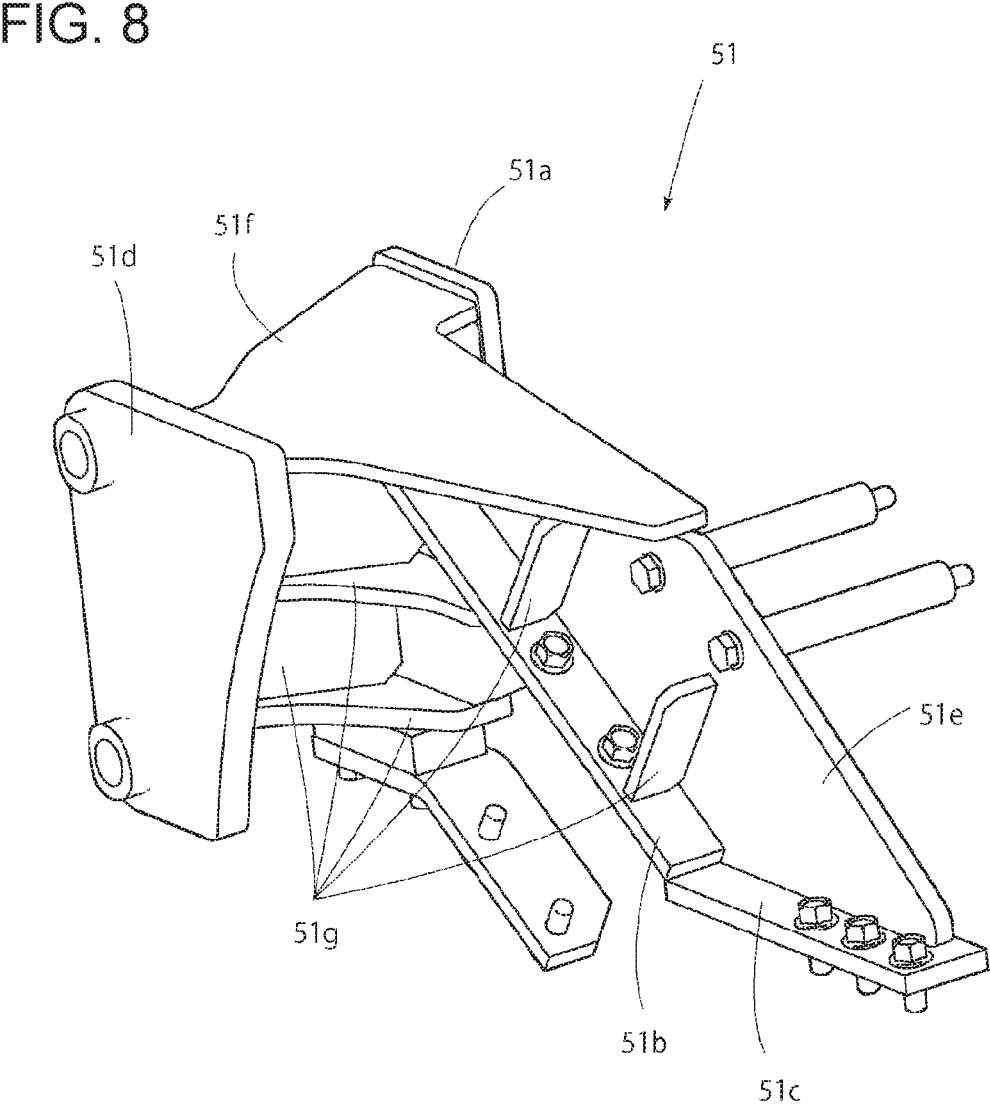
FIG. 8 A perspective view of an attachment bracket for the front dozer.

With reference to FIGS. 1, 7, and 8, a configuration of attaching the front dozer 50 will be described.

The front dozer 50 is configured to be attached to a front portion of the crawler tractor 1. A pair of front dozer brackets 51 is fixed to the front side surfaces of the pair of main frames 10, the front drive axle 6, and the pair of lower frames 27. This configuration enables the front dozer 50 to be attached to the pair of front dozer brackets 51.

The front dozer 50 includes a pair of support frames 52, a support arm 53, a blade 54, a pair of lifting/lowering cylinders 55, a pair of angle cylinders 56, a tilt cylinder 57, and a blade attachment body 58. The support frames 52 have plate shapes, and rear portions of the plate shapes are fixed to the outer ends of front dozer brackets 51 with bolts.

The rear ends of lateral end portions of the support arm 53 having substantially a U shape in plan view are pivotally supported on the lower front portions of the pair of support frames 52 to freely rotate vertically (top-bottom direction). The pair of lifting/lowering cylinders 55 is interposed between the upper front portions of the pair of support frames 52 and the sides of a front portion of the support arm 53. This configuration enables the support arm 53 to be lifted and lowered by expansion and contraction of the lifting/lowering cylinder 55.

The lateral center of the front ends of the support arm 53 and the rear surfaces of the lateral center of the plate-shaped blade attachment body 58 are pivotally supported by each other to freely rotate laterally. The pair of angle cylinders 56 is interposed between the rear portions of the lateral side portions of the support arm 53 and the rear surfaces of the lateral side portions of the blade attachment body 58. The blade attachment body 58 can rotate laterally by expansion and contraction of the pair of angle cylinders 56 in opposite directions.

The rear surface of the blade 54 is supported by the front surface of the blade attachment body 58 so that the blade can tilt. The tilt cylinder 57 is interposed between an upper portion of a lateral center of the blade 54 and the lateral sides of the blade attachment body 58. The blade 54 can tilt by expansion and contraction of the tilt cylinder 57. This configuration enables the blade 54 to be lifted and lowered, tilt longitudinally, and tilt vertically.

With reference to FIGS. 7 and 8, a configuration of the front dozer brackets 51 will be described.

The front dozer brackets 51 are fixed to the front frames 11, the front drive axle 6, and the lower frames 27. Each of the front dozer brackets 51 includes a main frame attachment plate 51a, an axle attachment plate 51b, a lower frame attachment plate 51c, a dozer attachment plate 51d, a coupling plate 51e, a coupling plate 51f, and reinforcing stays 51g.

The main frame attachment plate 51a, the axle attachment plate 51b, and the lower frame attachment plate 51c are fixedly coupled together by the coupling plate 51e that extends vertically and longitudinally. The main frame attachment plate 51a and the dozer attachment plate 51d are fixedly coupled together by the coupling plate 51f that is oriented horizontally and laterally. The reinforcing stays 51g are fixed to the main frame attachment plate 51a, the axle attachment plate 51b, the lower frame attachment plate 51c, the dozer attachment plate 51d, and the coupling plates 51e and 51f, as necessary.

The main frame attachment plate 51a in a front portion of the front dozer bracket 51 and a longitudinally intermediate portion of the coupling plate 51e are fixed to the front frames 11 with bolts. The axle attachment plate 51b in a lower portion of the longitudinally intermediate portion of the front dozer bracket 51 is fixed to the front drive axle 6 with bolts. The lower frame attachment plate 51c in a lower rear portion of the front dozer bracket 51 is fixed to the pair of lower frames 27 with bolts. The dozer attachment plate 51d in an outer portion of the front dozer bracket 51 is fixed to the support frame 52 of the front dozer 50 with bolts.

With this configuration, the pair of front dozer brackets 51 is fixed to the front portions of the pair of main frames 10, the front drive axle 6, and the pair of lower frames 27, and the front dozer 50 is attached to the pair of front dozer brackets 51. Thus, the pair of front dozer brackets 51 is firmly fixed to the three components: the pair of main frames 10, the front drive axle 6, and the pair of lower frames 27 of the crawler-type travelling device 2. As a result, strength enough to endure heavy work of the front dozer 50 can be obtained.

Figure 9:
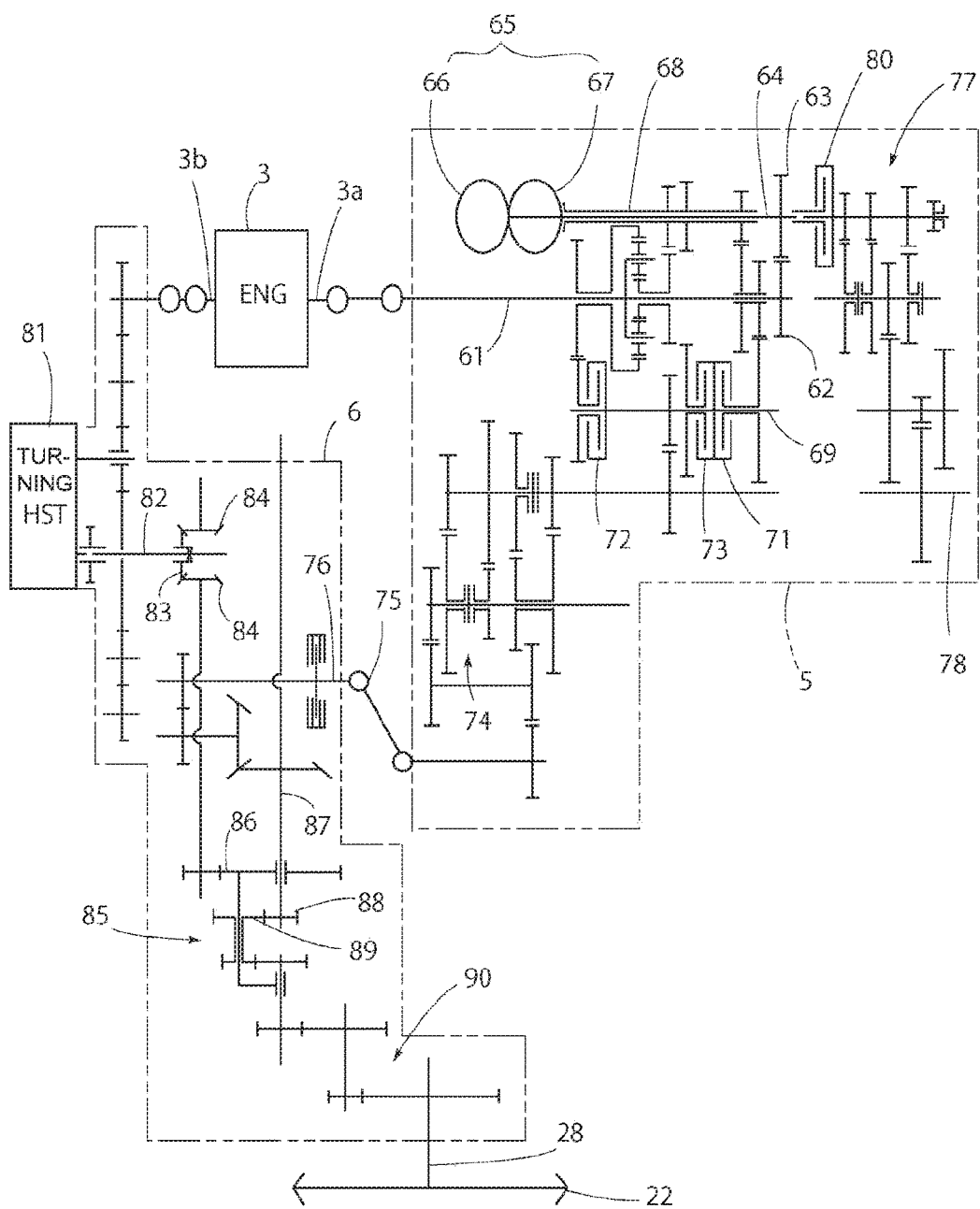
FIG. 9 A diagram of a power transmission mechanism.

With reference to FIG. 9, a power transmission mechanism will be described.

An input shaft 61 of the transmission case 5 is coupled to a rear output shaft 3a of the engine 3 through a universal joint. Power is transferred from the rear end of the input shaft 61 to a pump shaft 64 and a PTO clutch 80 through driving gears 62 and 63. A pump-motor serial arrangement type stepless transmission device 65 for straight travelling (hereinafter referred to as a straight-travelling HST 65) is disposed on the pump shaft 64. The straight-travelling HST 65 drives a hydraulic pump 66 and constitutes a main transmission device 60. The straight-travelling HST 65 includes a variable displacement hydraulic pump 66 and a fixed displacement hydraulic motor 67. In the main transmission device 60, the swash plate of the hydraulic pump 66 is tilted by operating the shift lever 96 so that the discharge rate is changed in a stepless manner to enable transmission.

A straight-travelling system transmission path 79 will be described.

The hydraulic pump 66 and the hydraulic motor 67 are disposed in series on the same shaft. Plungers (pistons) of the hydraulic pump 66 and the hydraulic motor 67 are disposed in one cylinder block. A motor shaft 68 of the hydraulic motor 67 is configured as a pipe shape, and is disposed on the pump shaft 64. An output from a gear disposed on the motor shaft 68 can be transferred to a first-speed clutch 71, a second-speed clutch 72, or a reverse clutch 73 arranged on the speed change shaft 69. The first-speed clutch 71 and the second-speed clutch 72 are automatically switched depending on the speed. The first-speed clutch 71, the second-speed clutch 72, and the reverse clutch 73 can be switched by a forward-reverse movement switching lever 99.

The first-speed clutch 71, the second-speed clutch 72, and the reverse clutch 73 constitute a forward-reverse movement switching device 70. An output from the first-speed clutch 71, the second-speed clutch 72, or the reverse clutch 73 is transferred to a sub-transmission device 74 through a transmission shaft or a driving gear, for example. The sub-transmission device 74 can change the speed by using a sub-transmission lever. An output from the sub-transmission device 74 is transferred to the input shaft 76 of the front drive axle 6 through a universal joint 75.

Power from the PTO clutch 80 can be subjected to speed change by the PTO transmission device 77 and transferred to a PTO shaft 78 projecting rearward from the rear surface of the transmission case 5. The PTO transmission device 77 can change the speed by using a PTO transmission lever. Power from the PTO shaft 78 can be transferred to a work machine attached to the working machine attachment device 13 through a universal joint.

The main transmission device 60, the sub-transmission device 74, the forward-reverse movement switching device 70, the PTO transmission device 77, and the pair of main frames 10 are configured to be shared by a wheel tractor and a crawler tractor. That is, a transmission except a differential device and a front-wheel driving unit has the same configuration in both a wheel type and a crawler type so that components can be shared, and costs can be reduced.

A turning-system transmission path 100 will be described.

A front output shaft 3b of the engine 3 is input to a hydraulic pump of a stepless transmission device 81 for turning (hereinafter referred to as a turning HST 81) through a gear, for example. The turning HST 81 includes a variable displacement hydraulic pump and a fixed displacement hydraulic motor, and is attached to the front surface of the front drive axle 6. A movable swash plate of the hydraulic pump of the turning HST 81 is continuous with the steering wheel 94. A motor shaft 82 of the hydraulic motor is inserted in the front drive axle 6. A bevel gear 83 is fixed to the front end of the motor shaft 82. The bevel gear 83 meshes with a pair of bevel gears 84. Rotation of the motor shaft 82 is transferred through the pair of bevel gears 84 to one bevel gear 84 as a forward rotation, and to the other bevel gear 84 as a reverse rotation.

Power from the pair of bevel gears 84 can be transferred to a carrier 86 of left and right planetary gear mechanisms 85 forming an enforced difference device. That is, while the steering wheel 94 does not rotate, the turning HST 81 is neutral, and the motor shaft 82 does not rotate. In a case where the steering wheel 94 rotates, the sash plate is tilted in accordance with the rotation direction and the rotation amount of the wheel, and in accordance with the tilt direction and the tilt amount of the sash plate, the rotation direction and the number of rotations of the motor shaft 82 of the turning HST 81 are changed.

Power from the input shaft 76 of the front drive axle 6 is transferred to a differential input shaft 87 of the planetary gear mechanism 85 through gears and bevel gears. A sun gear 88 of the planetary gear mechanism 85 is fixed to an end of the differential input shaft 87. The sun gear 88 meshes with a planetary gear 89. The planetary gear 89 is rotatably supported by a carrier shaft of the carrier 86. Power from the planetary gear mechanism 85 is transferred to the driving shafts 28 through a final speed reducing mechanism 90 and can drive the driving wheel 22.

With this configuration, in a case where the steering wheel 94 does not rotate, the turning HST 81 is neutral so that the motor shaft 82 does not rotate, and output rotation subjected to speed change by the transmission case 5 is transferred to the driving shafts 28 through the left and right final speed reducing mechanism 90, and the number of rotations is the same between the left part and the right part so that the vehicle travels straight.

In a case where the steering wheel 94 is rotated, the swash plate is tilted in accordance with the rotation direction and the rotation angle of the wheel, and in accordance with the tilt of the swash plate, the output rotation direction and the number of rotations are output to the motor shaft 82. Then, forward rotation is exerted from the motor shaft 82 to one of the left and right bevel gears 84 and then to a corresponding one of planetary gear mechanisms 85 so that the speed of a corresponding one of the driving shafts 28 increases, whereas reverse rotation is exerted to the other one of the left and right planetary gear mechanisms 85 so that the speed of the driving shafts 28 decreases. In this manner, the crawler tractor 1 turns to a speed reducing side to which the steering wheel 94 is rotated. When the steering wheel 94 is rotated, the seed of the main transmission device 60 is reduced in accordance with the rotation angle, and rapid turning can be prevented.

This configuration enables a compact configuration of the transmission case 5 in the lateral directions.

The forward-reverse movement switching device 70 is switched from forward to reverse or from reverse to forward, based on an instruction by an operator. With this configuration, in the crawler tractor 1, switching from forward to reverse or from reverse to forward can be quickly performed.

The crawler tractor 1 includes a forward-reverse movement switching lever 99. Based on an operation of the forward-reverse movement switching lever 99 by the operator, the forward-reverse movement switching device 70 is switched from forward to reverse or from reverse to forward.

With this configuration, the crawler tractor 1 can easily perform switching from forward to reverse or from reverse to forward.

Figure 5:
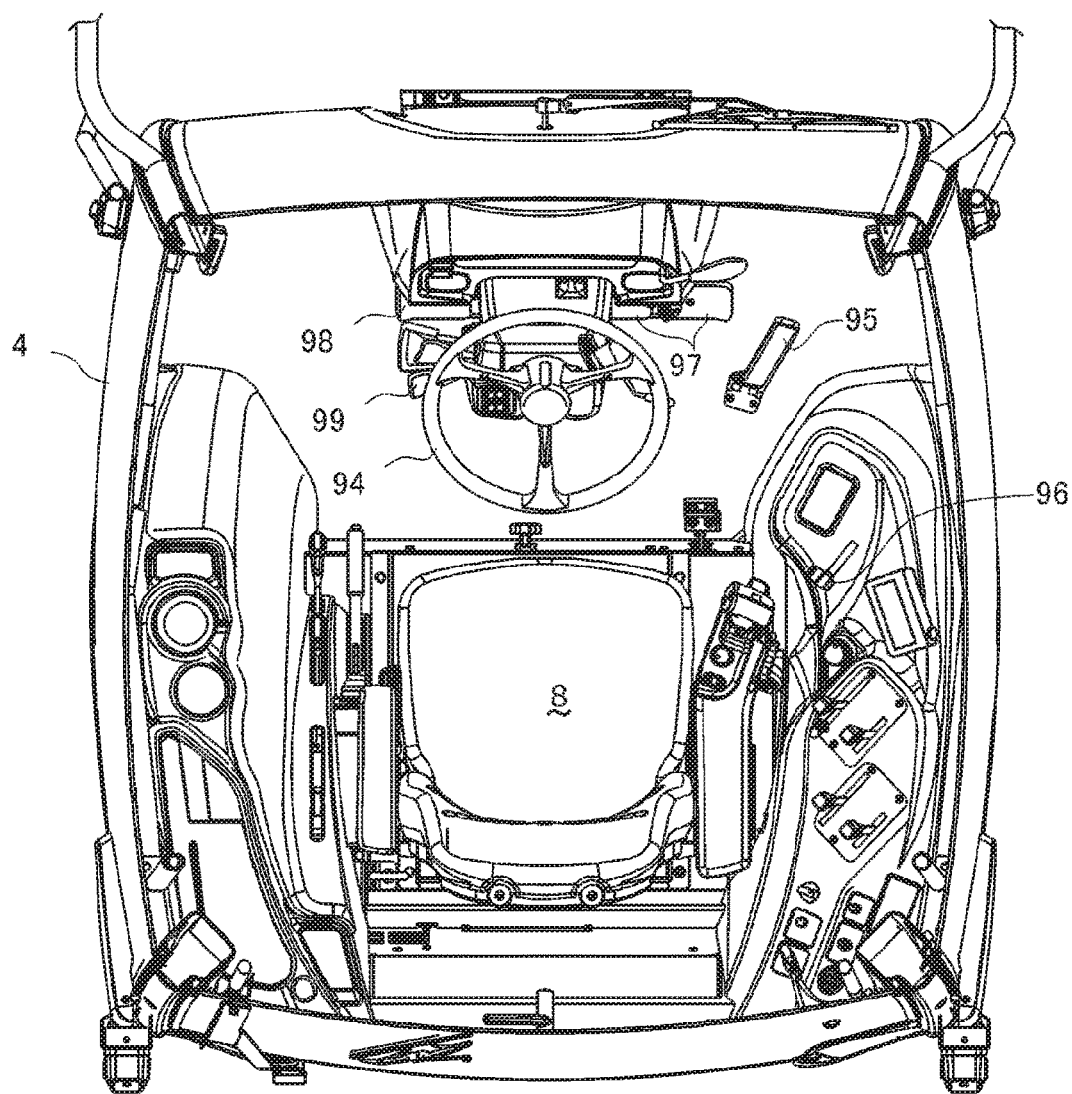
FIG. 5 A plan view illustrating a driver seat of a tractor and the periphery thereof.
Figure 6:
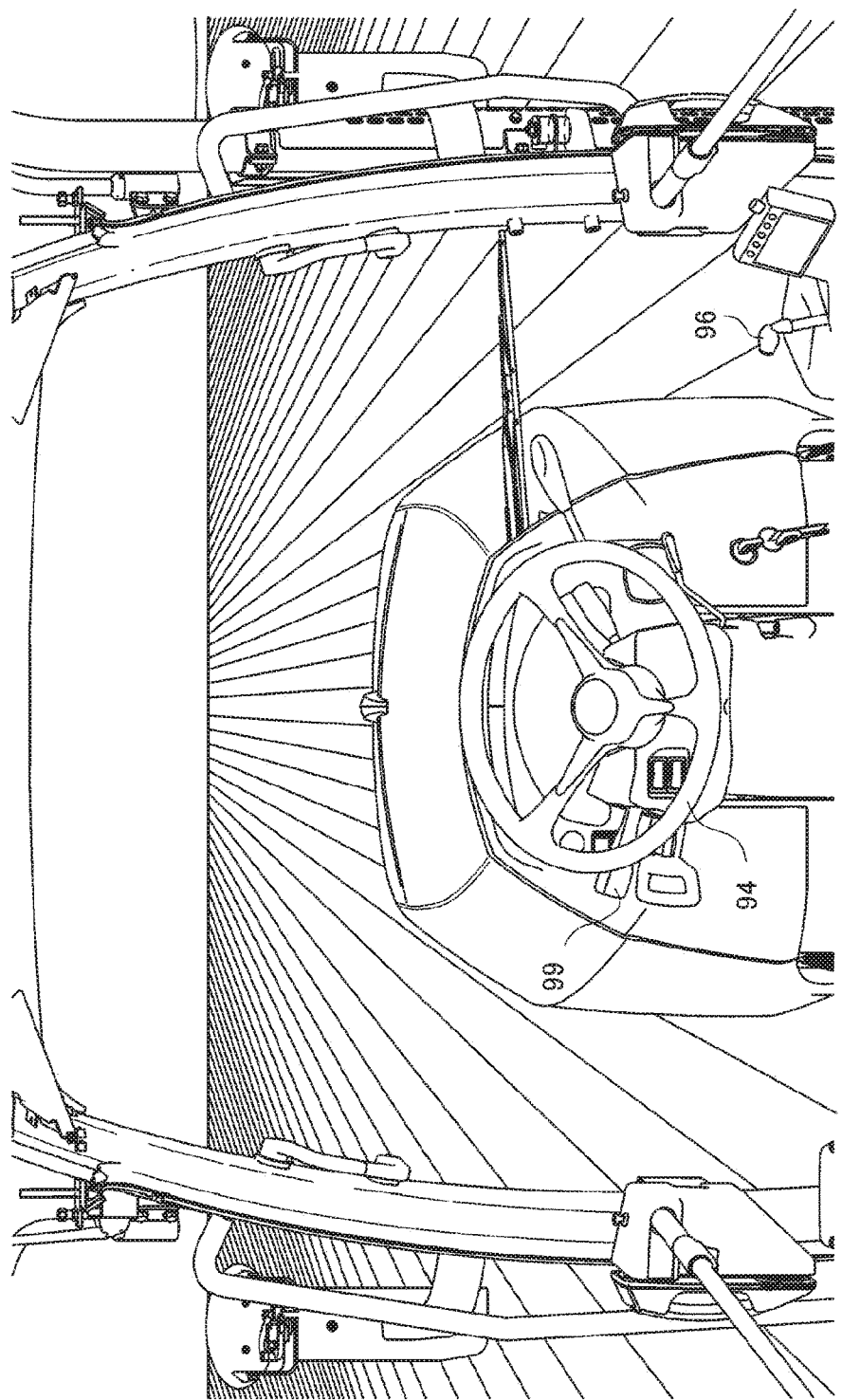
FIG. 6 An illustration showing a field of view of an operator.

In the crawler tractor 1, the forward-reverse movement switching lever 99 is disposed on a handle column 100 (see FIGS. 5 and 6). With this configuration, the crawler tractor 1 can be quickly and easily switched from forward to reverse or from reverse to forward.

Figure 10:
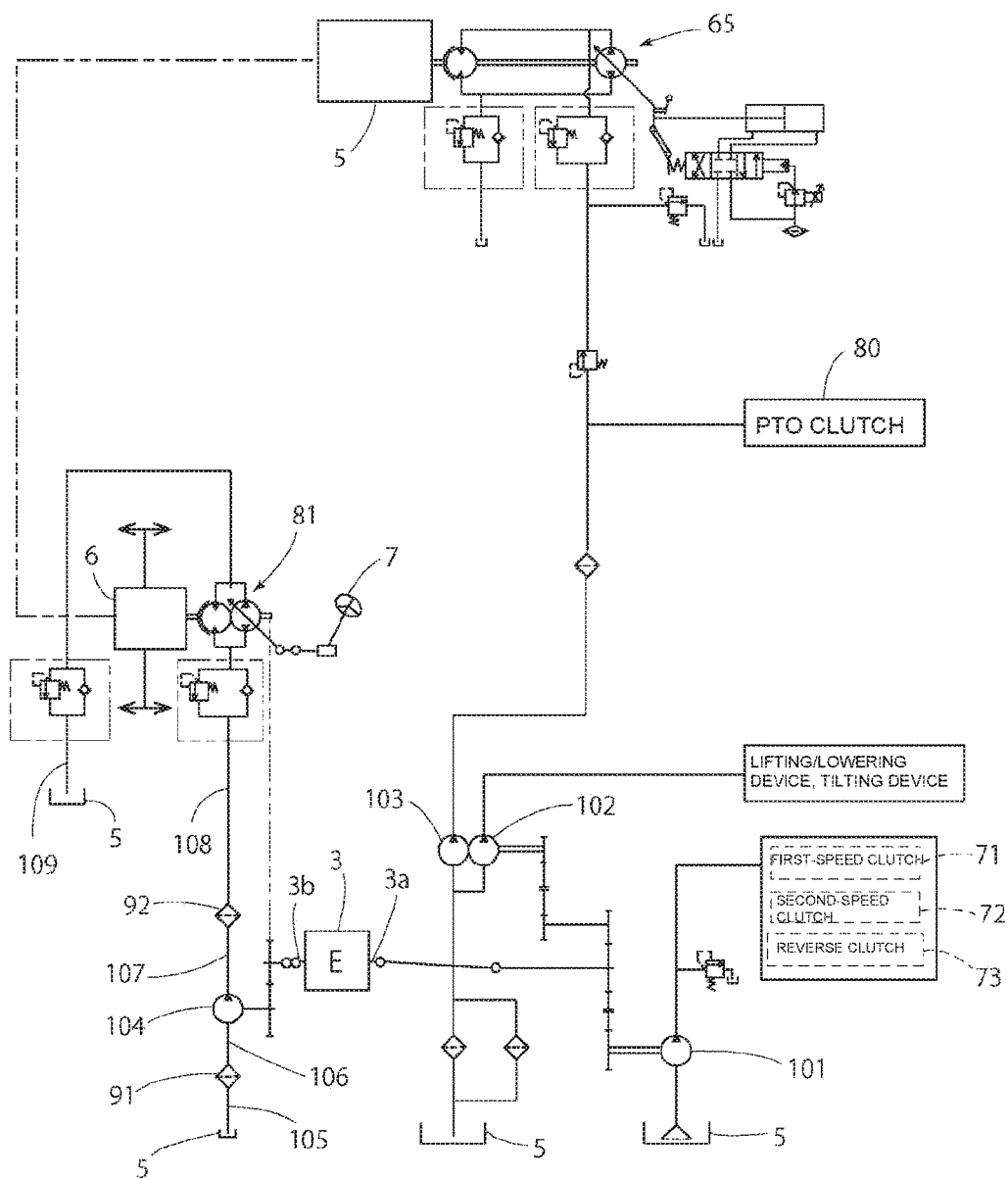
FIG. 10 A hydraulic circuit diagram.
Figure 11:
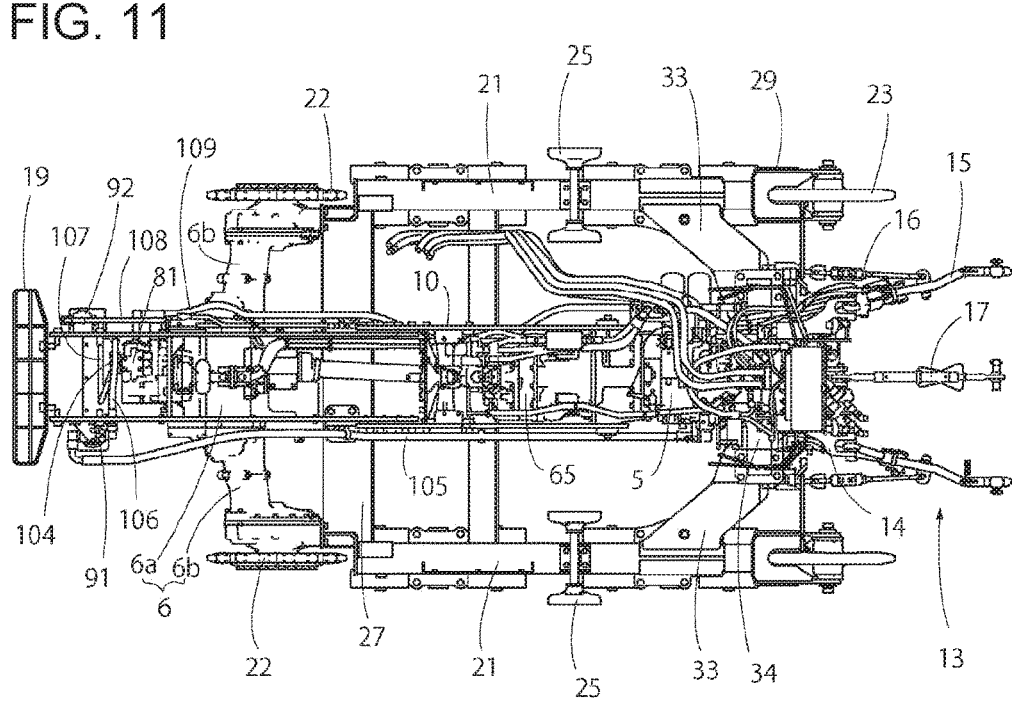
FIG. 11 A plan view illustrating a hydraulic pipe.

With reference to FIGS. 10 and 11, a hydraulic circuit will be described.

As illustrated in FIG. 10, lubricating oil stored in the transmission case 5 is used as hydraulic oil for the straight-travelling HST 65, the turning HST 81, a lifting/lowering device, or a hydraulic clutch. With an output from the rear output shaft 3a of the engine 3, hydraulic pumps 101, 102, and 103 are driven through gears, for example. With pressure oil discharged from the hydraulic pump 101, the first-speed clutch 71, the second-speed clutch 72, and the reverse clutch 73 are caused to be operable. With pressure oil discharged from the hydraulic pump 102, the lifting/lowering cylinder for lifting or lowering a work machine, the tilt cylinder, or an outer hydraulic pressure device are caused to be operative. With pressure oil discharged from the hydraulic pump 103, the straight-travelling HST 65 or the PTO clutch 80 are caused to be operable.

With an output from the front output shaft 3b of the engine 3, the hydraulic pump 104 is driven through gears, for example. Lubricating oil in the transmission case 5 is sucked into the hydraulic pump 104 as hydraulic oil through suction filters 91. Pressure oil discharged from the hydraulic pump 104 is supplied to a closed circuit of the turning HST 81 as a charging oil pressure through a line filter 92.

As illustrated in FIG. 11, the hydraulic pump 104 is disposed in front of the turning HST 81 attached to the front surface of the lateral center of the gear box 6a of the front drive axle 6. The suction filter 91 is attached to a side surface of a front portion of one of the pair of left and right main frames 10. The line filter 92 is attached to a side surface of a front portion of the other one of the pair of left and light main frames 10. The suction filter 91 communicates with a side surface of the transmission case 5 through a pipe 105.

The pipe 105 is disposed longitudinally along an outer side surface of one of the pair of left and right main frames 10. The suction filter 91 is connected to a suction port of the hydraulic pump 104 through a pipe 106. A discharge port of the hydraulic pump 104 is connected to the line filter 92 through a pipe 107. The line filter 92 and the turning HST 81 are connected to each other by a pipe 108. Return oil of the turning HST 81 is caused to return to the transmission case 5 through a pipe 109. The pipe 109 is disposed along the outer side surface of the other one of the pair of left and right main frames 10.

In this configuration, since the side surfaces of front portions of the pair of main frames 10 are open to the sides, the suction filter 91 and the line filter 92 can be disposed in open space. Consequently, maintenance can be easily performed from the outside. In addition, the bumper 19 is disposed forward of the suction filter 91 and the line filter 92 to protect the suction filter 91 and the line filter 92 against an obstacle coming from the front.

INDUSTRIAL APPLICABILITY

The present invention is applicable to crawler tractors.

REFERENCE SIGNS LIST 1 crawler tractor
2 crawler-type travelling device
3 engine
5 transmission case
6 front drive axle
10 main frame
21 truck frame
22 driving wheel
27 lower frame
33 rear beam
34 rear housing

The invention claimed is:

1. A crawler tractor comprising:
a pair of main frames extending longitudinally;
a pair of truck frames constituting a crawler-type travelling device and extending longitudinally;
a pair of lower frames coupling the pair of truck frames to each other and extending laterally;
a pair of beams projecting from rear portions of the pair of truck frames toward a lateral center;
a pair of rear mounts configured to be attached to left and right sides of a rear portion of a transmission case; and
a pair of rear housings configured to be coupled to left and right sides of the transmission case,
wherein:
the transmission case is configured to be coupled to rear portions of the pair of main frames,
front portions of the pair of main frames are coupled to front portions of the pair of truck frames through a front drive axle,
longitudinal intermediate portions of the pair of main frames are coupled to the pair of lower frames,
a fuel tank and a rear portion of a cabin are fixed onto the pair of rear mounts; and
the rear portions of the pair of main frames are coupled to the pair of rear housings through the pair of beams.

2. The crawler tractor according to claim 1, wherein:
the front portions of the pair of main frames, the front drive axle, and the pair of lower frames are fixed to a front dozer bracket,
and a front dozer is attachable to the front dozer bracket.

3. The crawler tractor according to claim 1, further comprising:
a straight-travelling stepless transmission device is disposed in the transmission case,
a turning stepless transmission device is disposed on the front drive axle,
a pump shaft disposed in the straight-travelling stepless transmission device, the pump shaft comprising:
a hydraulic pump; and
a hydraulic motor disposed in series with the hydraulic pump; and
a motor shaft disposed on the pump shaft, the motor shaft configured to serve as an output shaft of the straight-travelling stepless transmission device, and
wherein power of the motor shaft is transferred to the front drive axle through a forward-reverse movement switching device and a sub-transmission device to thereby cause the crawler-type travelling device to operate.

4. A crawler tractor comprising:
a transmission case;
a pair of main frames attached to the transmission case;
a front drive axle provided with a front axle case, the front axle case is fixed onto the pair of main frames;
a pair of truck frames extending longitudinally;

a first and second lower frame, each of the first and second lower frames extending laterally and connecting the pair of truck frames;

a pair of beams projecting from rear portions of the pair of truck frames toward a lateral center;

a pair of rear housings attached to left and right sides of the transmission case;

wherein:
the transmission case is attached to a rear portion of each of the pair of main frames;

a front portion of each of the pair of main frames are attached to the pair of truck frames via the front drive axle; and the pair of beams extend from the pair of truck frames to the pair of rear housings.

5. The crawler tractor according to claim 4, wherein the pair of truck frames are fixed to the front axle case.

6. The crawler tractor according to claim 5, further comprising:
a pair of coupling brackets attached to the pair of main frames; and
wherein the pair of truck frames are coupled to the pair of coupling brackets via the first and second lower frames.

7. The crawler tractor according to claim 4, further comprising:
a straight-travelling stepless transmission device is disposed in the transmission case,
a turning stepless transmission device is disposed on the front drive axle,
a pump shaft disposed in the straight-travelling stepless transmission device, the pump shaft comprising:
a hydraulic pump; and
a hydraulic motor disposed in series with the hydraulic pump; and
a motor shaft disposed on the pump shaft, the motor shaft configured to serve as an output shaft of the straight-travelling stepless transmission device, and
wherein power of the motor shaft is transferred to the front drive axle through a forward-reverse movement switching device and a sub-transmission device to thereby cause a crawler-type travelling device to operate.

8. The crawler tractor of claim 4, wherein the first lower frame is fixed onto each of the pair of truck frames, and the second lower frame is fixed onto each of the pair of truck frames.

9. The crawler tractor of claim 8, further comprising:
a pair of coupling brackets fixed to an upper surface of the first lower frame; and
wherein the pair of main frames are fixed to the first lower frame via the pair of coupling brackets.

10. The crawler tractor of claim 4, wherein the rear portion of each of the pair of main frames is disposed above the first and second lower frames, and a middle portion of each of the pair of main frames fixed onto the front axle case.

11. The crawler tractor of claim 4, wherein the pair of main frames are directly coupled to the front axle case.

12. The crawler tractor of claim 4, wherein the pair of beams are fixed onto an upper surface of the pair of truck frames and extend from the pair of truck frames to the pair of rear housings.

13. A crawler tractor comprising:
a crawler travelling device comprising:
left and right truck frame members extending longitudinally; and
first and second lower frame members extending laterally from the left truck frame member to the right truck frame member; and
a body frame coupled to the crawler travelling device, the body frame comprising:
left and right main frame members extending longitudinally and coupled to the first and second lower frame members, rear portions of the left and right main frame members configured to be coupled to a transmission case;
a left housing configured to be coupled to a left side of the transmission case;
a right housing configured to be coupled to a right side of the transmission case;
a left mount coupled to the left housing, the left mount configured to be coupled to a first fuel tank and a cabin; and
a right mount coupled to the right housing, the right mount configured to be coupled to a second fuel tank and the cabin; and
wherein:
the first fuel tank fixed onto the left mount and the second fuel tank fixed onto the right mount; and
the cabin fixed onto an upper surface of the left mount and an upper surface of the right mount.

14. The crawler tractor of claim 13, further comprising:
the transmission case;
a left beam extending from a rear portion of the left truck frame member toward a lateral center; and
a right beam extending from a rear portion of the right truck frame member toward a lateral center.

15. The crawler tractor of claim 13, further comprising:
a pair of coupling brackets fixed to an upper surface of the first lower frame member; and
wherein the left and right main frame members are fixed to the first lower frame member via the pair of coupling brackets.

16. The crawler tractor of claim 13, wherein the first lower frame member is attached to the left and right truck frame members, and the second lower frame member is attached to the left and right truck frame.

* * * * *